Patented Feb. 3, 1931

1,790,950

UNITED STATES PATENT OFFICE

CHARLES J. SALA, OF WILMINGTON, DELAWARE, ASSIGNOR TO E. I. DU PONT DE NEMOURS & COMPANY, OF WILMINGTON, DELAWARE, A CORPORATION OF DELAWARE

ART OF PRINTING WITH VAT DYES

No Drawing.    Application filed November 17, 1925.  Serial No. 69,706.

This invention is concerned with the art of printing textiles with vat dyes. More particularly it relates to the preparation and application to cotton fabric of a printing paste containing a vat dye and a material adapted to facilitate the dyeing operation. The invention also relates to the paste and to the fabric imprinted therewith as articles of manufacture.

As is well understood in the art, by the term "vat dye" is meant a coloring matter insoluble in water, but which can be converted on reduction into a so-called leuco compound which is soluble in solutions of alkali. Such vat dyes are characterized by their excellent fastness but the difficulty of printing them satisfactorily has heretofore been a drawback to their use in this connection. One of the objects of the present invention is to overcome this difficulty in the manner described in detail below.

In calico printing with vat dyestuffs, as carried out at present, the unreduced dye is made into a paste with a strong reducing agent such as formaldehyde hydrosulfite or sodium hydrosulfite, together with a suitable alkali and a thickening agent such as a starch paste or gum. The paste is applied to the cloth in the usual manner from an engraved copper roller and the print is then dried. The dye at this stage is not on the fiber but merely in the paste. In order to effect the actual dyeing, the calico is subjected to the action of saturated steam for a period of about 3 to 5 minutes. During that very brief time the vat color must undergo reduction and must pass over to the cotton.

Vat dyes, however, at the time of printing, are not in true solution, but are in a state of colloidal dispersion. For this reason the effecting of complete reduction of the dye and the transfer of the color to the fabric in the brief time which the goods are steamed is a process accompanied by great difficulties. In order to make sure that satisfactory results are obtained, it is important that the dye paste be of special fineness, but even then a great deal of color is lost because of its failure to dye the cotton. This excess color is washed off during the soaping which follows the steaming.

I have now found, however that certain organic compounds, when mixed into the paste, produce markedly improved results. These organic compounds are not in themselves new but the use of them for this purpose is entirely new so far as I know. The compounds I employ are substituted aliphatic amines containing hydroxyl groups in the aliphatic radicals; they are strongly basic.

The general formula for substances of this class is:

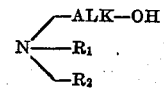

in which ALK represents an aliphatic radical as, for instance, the alkylene group $C_2H_4$; $R_1$ represents either hydrogen or a hydroxy-aliphatic group, as $CH_2CH_2OH$ and $R_2$, as $R_1$, represents hydrogen or a hydroxy aliphatic group.

In carrying my invention into effect I mix the vat dye into a paste with a thickening agent, reducing agent, and alkali as is customary, but I also incorporate therewith a certain quantity of the ingredient adapted to facilitate the printing operation. The resulting paste is printed on the fabric, which is then exposed to steam, as is customary, to produce the reduction of the vat coloring matter and the actual dyeing of the material. The presence of the new dye assistant very effectively aids the transfer of the dye to the cotton, and very superior results are obtained.

In order to fully disclose my process the following example of a typical paste is furnished. It is to be understood, however, that this example is an illustration only and that the conditions, proportions and reagents specified therein may be varied within wide limits.

Example 50 grams of the vat color, which may be Ponsol blue GD (Schultz #842), 400 grams starch-gum-trag. thickener, 140 grams potassium carbonate, 200 grams of a 1:1 water solution of formaldehyde-hydrosulfite, 100 grams water, 80 grams of the new dye assisting compound, 30 grams Dissolving salt B (the sodium salt of benzyl-metanilic acid).

The formaldehyde-hydrosulfite is made from formaldehyde and sodium hydrosulfite, and contains about 88%

$$(NaHSO_2.CH_2O + 2H_2O).$$

The use of the dissolving salt is not essential as tests of pastes from which it was omitted have indicated. The quantity of the new dye assistant compound employed may be varied largely from the amount stated. As suitable dye assistants may be mentioned, for example, the hydroxy-alkyl amines as mono-ethylolamine, di-ethylolamine, tri-ethylolamine, as well as the amines containing aliphatic groups with more than one hydroxyl group as, for instance, such groups as  Other colors than that employed in the example can, of course, be employed.

The method of preparing the paste from these materials, also, may be varied by the printer, but the ingredients must be thoroughly mixed. One method of preparation, for example only, comprises mixing the components, other than the reducing agent and dye assistant, and heating to boiling. The paste is then allowed to cool and the reducing agent incorporated when a temperature of about 170° F. is reached. The dye assistant is then added to the mixture. In other cases it is preferred to make the paste without heating so strongly.

If the paste is permitted to stand over night before printing, the print will be fuller. This is not an essential step, however, as the paste may be applied at once. The print is made in the usual manner, steamed (five minutes, for example), washed and finally boiled with soap.

I claim:

1. In a process of applying a vat dye to a fabric the step of mixing with said dye a hydroxy substituted aliphatic amine adapted to facilitate the transfer of the color to said fabric.

2. In a process of applying a vat dye to cotton the step which comprises mixing with a paste containing said dye a hydroxy substituted amine comprising an aliphatic radical containing a hydroxyl group.

3. In a process of applying a vat dye to cotton the step which comprises mixing with a paste containing said dye a compound having the structural formula

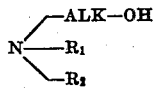

wherein ALK-OH represents an aliphatic radical containing at least one hydroxy group, $R_1$ represents either hydrogen or an aliphatic radical containing at least one hydroxy group, and $R_2$ represents either hydrogen or an aliphatic radical containing at least one hydroxy group.

4. In a process of applying a vat dye to cotton the step which comprises mixing with a paste containing said dye a compound of the type described in claim 3, wherein $R_1$ represents a hydroxy-aliphatic group.

5. In a process of applying a vat dye to cotton the step which comprises mixing with a paste containing said dye a compound of the type described in claim 3, wherein $R_1$ represents a hydroxy-aliphatic group and $R_2$ represents hydrogen.

6. In a process of applying a vat dye to cotton the step which comprises mixing with a paste containing said dye a compound of the type described in claim 3, wherein $R_2$ represents hydrogen.

7. In a process of applying a vat dye to cotton the step which comprises mixing with a paste containing said dye a compound of the type described in claim 3, in which compound ALK-OH represents the radical $CH_2CH_2OH$.

8. In a process of applying a vat dye to cotton the step which comprises mixing with a paste containing said dye a compound of the type described in claim 3, in which compound both ALK-OH and $R_1$ represent the radical $CH_2CH_2OH$.

9. In a process of applying a vat dye to cotton the step which comprises mixing with a paste containing said dye a compound of the type described in claim 3, in which compound ALK-OH and $R_1$ represent the radical $CH_2CH_2OH$ and $R_2$ represents hydrogen.

10. The process set forth in claim 3 wherein the amino compound contains at least one ethylene group.

11. The process set forth in claim 3 wherein the amino compound contains at least two aliphatic groups.

12. The process of applying a vat dye to a cotton fabric which comprises incorporating into a printing paste containing said dye and a reducing agent, a compound of the type described in claim 3, printing said fabric with the resulting paste and exposing the printed fabric to steam to effect reduction of the dye.

13. A printing paste comprising a vat color and a hydroxy substituted aliphatic amine adapted to facilitate the application of said color to cotton.

14. A printing paste comprising a vat color and a compound of the type described in claim 3.

15. A printing paste comprising a finely divided vat color, a thickener, an alkali, a reducing agent and a compound of the type described in claim 3.

16. A printed cotton fabric, the prints thereon comprising a color resulting from the application to the fabric and reduction on the fabric of a vat dye in the presence of a compound of the type designated in claim 3.

17. A printed cotton fabric, the print thereon comprising a vat dyestuff in admixture with a reducing agent, an alkali and a compound of the type designated in claim 3.

In testimony whereof I affix my signature.

C. J. SALA.